United States Patent
Lamba

(10) Patent No.: US 9,135,545 B1
(45) Date of Patent: Sep. 15, 2015

(54) MAGNETIC STRIPE EMULATOR FOR PERSISTENTLY EMULATING MAGNETIC STRIPE DATA

(71) Applicant: Square, Inc., San Francisco, CA (US)

(72) Inventor: Kartik Lamba, Berkeley, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/478,522

(22) Filed: Sep. 5, 2014

(51) Int. Cl.
*G06K 19/06* (2006.01)

(52) U.S. Cl.
CPC .................. *G06K 19/06206* (2013.01)

(58) Field of Classification Search
CPC .......... G06K 19/06206; G06K 19/07
See application file for complete search history.

(56) References Cited

U.S. PATENT DOCUMENTS

| | | | |
|---|---|---|---|
| 8,590,796 B1 * | 11/2013 | Cloutier et al. | 235/488 |
| 2009/0159667 A1 * | 6/2009 | Mullen et al. | 235/380 |
| 2011/0174874 A1 * | 7/2011 | Poznansky et al. | 235/379 |

* cited by examiner

*Primary Examiner* — Sonji Johnson
(74) *Attorney, Agent, or Firm* — Perkins Coie LLP

(57) ABSTRACT

A proxy card for persistently emulating a set of magnetic stripe data associated with a payment card is disclosed. The proxy card provides a magnetic stripe emulator that includes a plurality of parallel traces of conductive material oriented in a direction perpendicular to a direction in which the proxy payment card is designed to be swiped. The parallel traces are coated with a layer of a magnetic medium of low coercivity. A microcontroller on the proxy card generates electrical signals to drive electrical current along each of the plurality of parallel traces in a selected direction. The electrical current causes alignment of particles in the magnetic medium of the magnetic stripe emulator which encodes the set of magnetic stripe data on the magnetic stripe emulator. The proxy card can then emulate the payment card when swiped through a magnetic card reader without consuming any power.

7 Claims, 8 Drawing Sheets

MAGNETIC STRIPE EMULATOR FOR PERSISTENTLY EMULATING MAGNETIC STRIPE DATA

BACKGROUND

A proxy payment card (hereinafter simply "proxy card") is a physical card, similar in appearance to a traditional magnetic stripe payment card (e.g., a credit card or debit card) and readable by a traditional magnetic card reader, but it can emulate one or more other payment cards. For example, a proxy card of a particular cardholder may be configurable to emulate either the cardholder's Visa card or MasterCard for any purchase from any given merchant, according to the cardholder's choice at the time of purchase. A proxy card may include electronics, an emulator coil, and other components to store multiple sets of magnetic stripe data, for e.g., card data for two or more payment cards, and can emulate any one of the sets of stored magnetic stripe data. When such a proxy card is swiped through a magnetic read head of a magnetic stripe card reader, a microcontroller on the proxy card controls the emulator coil, causing the emulator coil to "play back" a set of magnetic stripe data sequentially to an emulator coil on the proxy card. The play back causes the emulator coil to produce a magnetic field, which in turn induces a read signal in the magnetic read head coil. The read signal is then decoded by the magnetic read head to obtain the magnetic stripe data.

The above described play back method emulates magnetic stripe data only when the proxy card is powered on. Thus, at the time of each swipe, a user has to power on the proxy card in order to use the proxy card. Consequently, the proxy card can consume a significant amount of power, which can reduce a battery life of the proxy card. Moreover, the play back speed of the proxy card depends on the speed at which the proxy card is swiped and can lead to decoding error. For example, if a user (e.g., the consumer or the merchant) swipes the proxy card at a swipe speed faster than the play back speed, the magnetic read head may not be able to obtain a complete read signal. Consequently, the user may have to swipe the proxy card multiple times before the magnetic read head can obtain a successful read. That wastes both the consumer's and the merchant's time and causes annoyance to both of them.

BRIEF DESCRIPTION OF THE DRAWINGS

One or more embodiments of the present disclosure are illustrated, by way of example and not limitation, in the figures of the accompanying drawings in which like references indicate similar elements.

DETAILED DESCRIPTION

The present disclosure is related to a proxy card (or more generally a data-bearing card) having a magnetic stripe emulator that is capable of persistently emulating magnetic stripe data associated with a payment card in an energy efficient manner. The magnetic stripe emulator of the proxy card introduced here comprises parallel traces of conductive material oriented in a direction perpendicular to the (longitudinal) direction in which the proxy card is designed to be swiped. The traces can extend across substantially the entire length of the proxy card and are coated with a layer of a magnetic medium having a low coercivity. The layer of the low coercivity magnetic medium ensures that magnetic stripe data can be encoded in the magnetic medium by magnetic fields induced by electrical current flowing through each of the traces in a selected direction. As the polarization in the magnetic medium induced by the magnetic fields remains persistent, the encoding is also persistent and the magnetic stripe emulator can emulate the encoded magnetic stripe data multiple times without expending any energy. Thus, a proxy card of the present disclosure does not need to be powered on in order to emulate magnetic stripe data that is encoded into a magnetic stripe emulator of the proxy card.

The present disclosure is also related to a proxy card having a magnetic stripe emulator that can emulate magnetic stripe data in a non-persistent manner. The magnetic stripe emulator of such a proxy card includes parallel traces of conductive material that are not coated with a magnetic medium. The proxy card can therefore induce a magnetic field emulating the magnetic stripe data only while electrical current is being driven through each of the parallel traces in selected directions. Once the proxy card is powered off, the proxy card can no longer emulate the magnetic stripe data.

Embodiments of the proxy card introduced here overcome disadvantages of existing proxy cards that rely on data play back methods for emulation by providing a magnetic stripe emulator that does not depend on a speed at which the proxy card is swiped. Consequently, even if the proxy card is swiped fast, as long as the swipe speed is within the decoding range of a magnetic stripe reader, the magnetic stripe reader will likely be able to read and decode an emulated signal from the proxy card in an error free manner.

Various embodiments of a proxy card and a method for persistently and non-persistently emulating magnetic stripe data associated with a payment card by the proxy card will now be described in greater detail.

Figure 1:
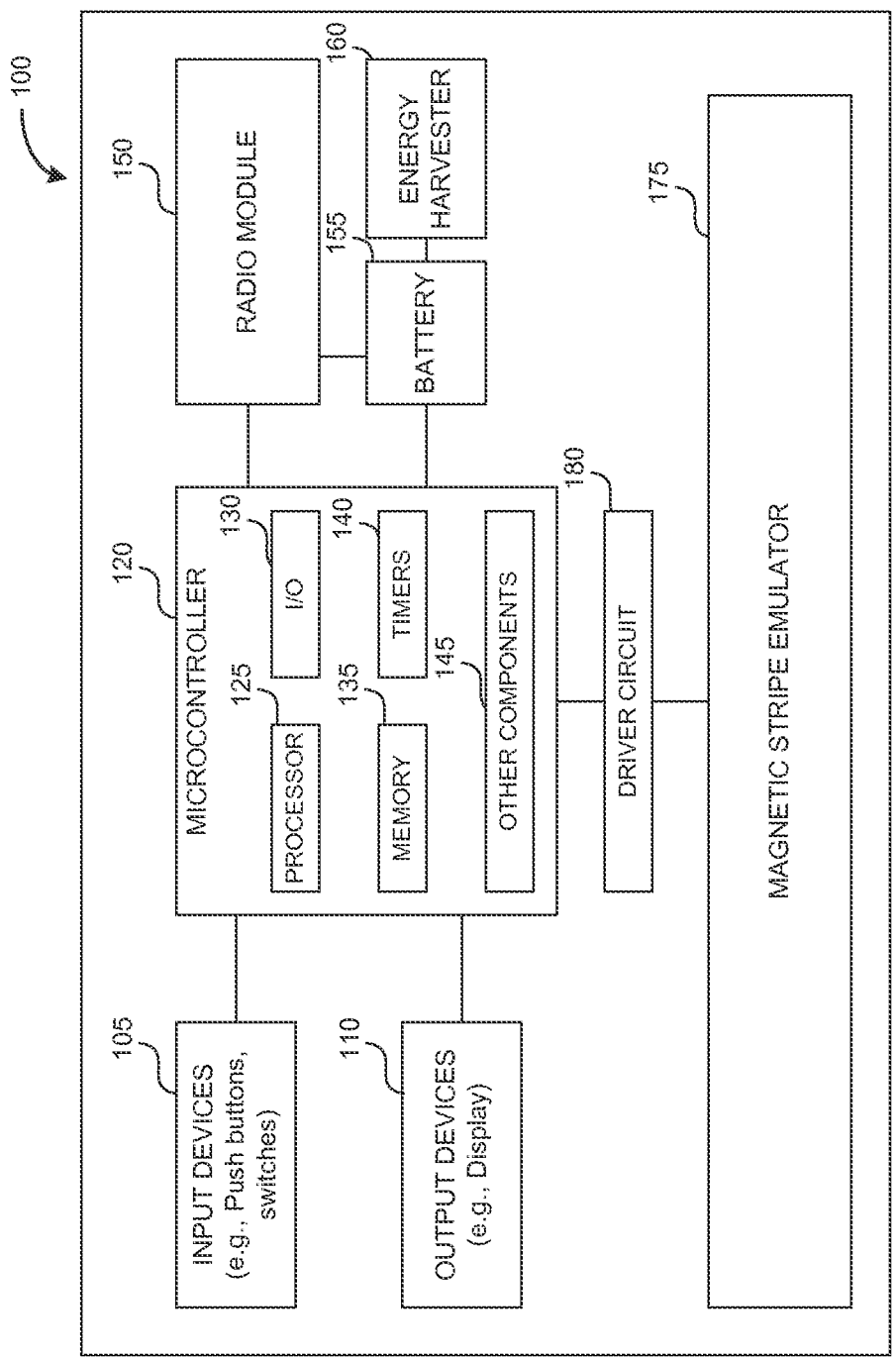
FIG. 1 is a high-level block diagram illustrating example components of a proxy card.

FIG. 1 is a high-level block diagram illustrating example components of a proxy card 100. The proxy card 100 includes a magnetic stripe emulator 175 that extends along substantially the entire length of the proxy card 100 and produces magnetic field. The proxy card 100 includes a microcontroller 120 that controls the magnetic stripe emulator 175 via a driver circuit 180. The microcontroller 120 generates and sends electrical signals corresponding to a bit pattern of the magnetic stripe data via the driver circuit 180 to the magnetic stripe emulator 175 to cause an alignment of magnetic dipoles in a magnetic medium of the magnetic stripe emulator. The alignment of magnetic dipoles persistently encode the bit pattern of the magnetic stripe data for emulation. The process of encoding magnetic stripe data into a magnetic stripe emulator is described in detail in reference to FIG. 2.

The microcontroller 120 generally includes a processor 125, one or more input/output ports or interfaces 130, a memory 135, timers 140 and other components 145 (e.g., analog to digital converters). The memory 135 stores magnetic stripe data associated with one or more payment cards, for example, credit cards, debit cards, gift cards or pre-paid cards or any data bearing cards (e.g., payment cards, access cards).

The proxy card 100 also includes one or more input devices 105 for selecting a payment card for emulation. The input devices 105 can be or include, for example, push buttons, switches, touch screens and so on. In some embodiments, the proxy card 100 includes a radio module 120 that enables radio communication between the components in the proxy card 100 and other components outside of the proxy card 100. For example, magnetic stripe data associated with a payment card can be loaded into the memory 135 from an external device (e.g., a mobile device such as a smartphone, or a computer system) using the radio module 120. The radio module 120 can support various short range and/or medium range radio communication technologies including, for example, Near-Field Communication (NFC), Bluetooth, Wi-Fi, Zigbee and any other wireless (or wired) communication technologies. The proxy card 100 can also include one or more output devices 100 to display various types of information. For example, information relating to a payment card that is currently being emulated by the magnetic stripe emulator 175 can be displayed on an output display device 110.

In the illustrated embodiment, all of the electronic components on the proxy card are powered by a battery 155. The battery 155 can be any battery suitable to meet the power requirements of the electronic components on board. By way of example, the battery 155 can be rechargeable thin film battery using lithium ion or another technology. In some embodiments, an energy harvester 160 can be integrated in the proxy card 100 to convert ambient energy (e.g., vibration, radio frequency or other sources of energy) into electrical energy to charge the battery 155.

Figure 2:
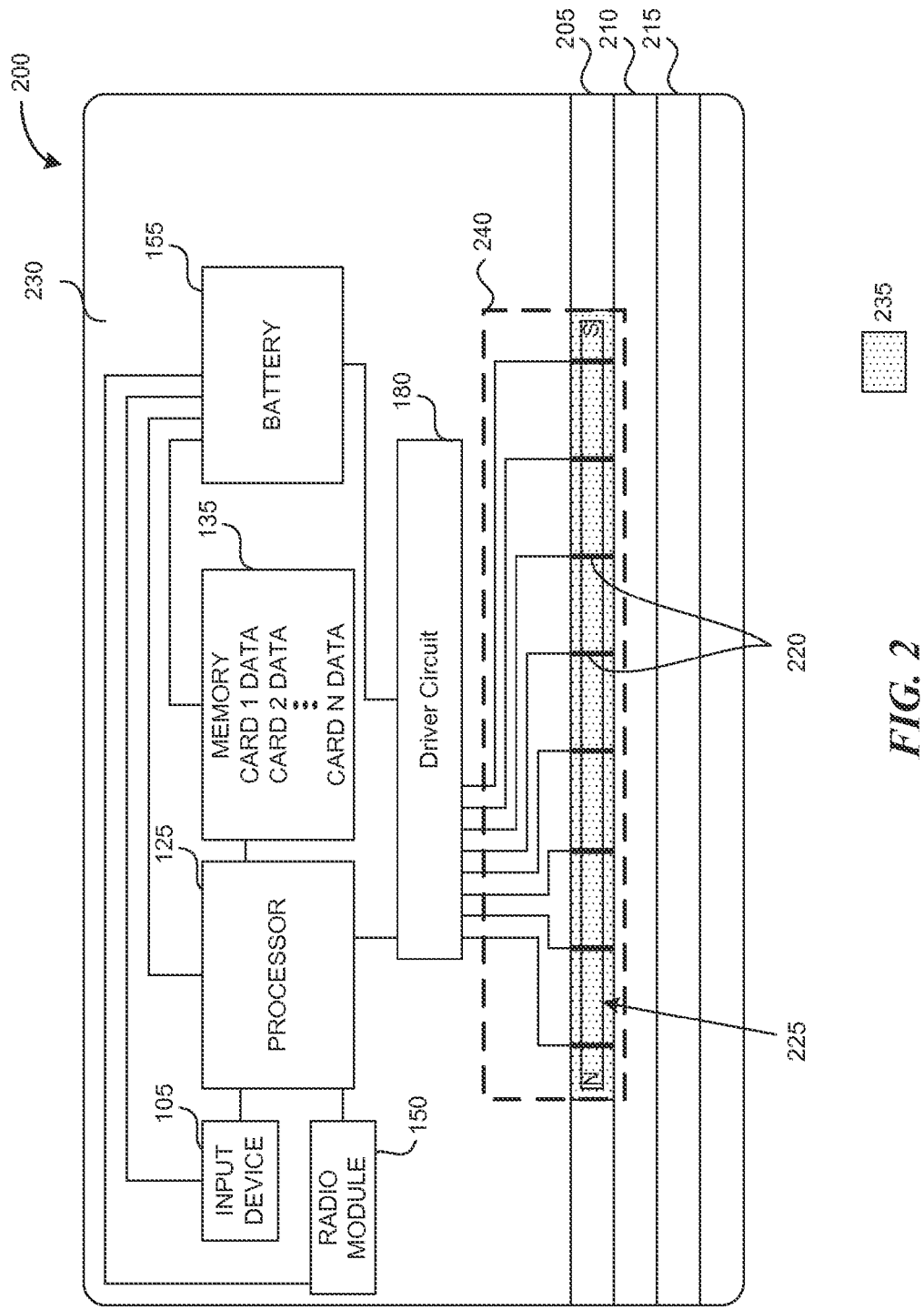
FIG. 2 is a block diagram illustrating a proxy card with a magnetic stripe emulator in an un-encoded state.

FIG. 2 is a block diagram illustrating a proxy card with a magnetic stripe emulator in an un-encoded state. The proxy card 200 includes many of the components described with reference to proxy card 100 of FIG. 1. As illustrated, a substrate 230 forms a body of the proxy card 200. The substrate 230 is generally made of nonconductive material and can be a flexible printed circuit board in some embodiments. Various illustrated electronic components can be wholly or partially embedded or surface mounted on the substrate 230. Examples of the electronic components coupled to the substrate 230 include an input device 105, a processor 125 and a memory 135 (e.g., as part of a microcontroller 120), a driver circuit 180, a battery 155 and one or more magnetic stripe emulators 205, 210, 215. Apart from the magnetic stripe emulators, other components in the substrate 230 need not be positioned as depicted in FIG. 2.

As illustrated, the proxy card 200 provides a magnetic stripe emulator (e.g., 205, 210 or 215 at track 1, track 2 or track 3 location respectively). As illustrated by the zoomed in section 240, the magnetic stripe emulator 205 includes a series of parallel traces 220 that are spaced apart from each other. The parallel traces 220 can run along substantially the entire (horizontal) length of the proxy card 200. The parallel traces 220 are oriented in a direction that is perpendicular to the direction in which the proxy card 200 is designed to be swiped. The parallel traces 220 are made of a conductive material (e.g., copper). Each of the parallel traces 220 is covered along its entire length with a layer of a magnetic material or medium 235. In an un-encoded state, the magnetic material 235 acts as a magnetic dipole having two stable polarities (i.e., North and South poles) as illustrated. When the proxy card 200 is swiped through a magnetic card reader with the magnetic material 235 in the un-encoded state, the magnetic stripe reader will not be able to obtain a decodable signal because the proxy card 200 in the un-encoded state cannot emulate a payment card. In some embodiments, the magnetic material 235 can be any soft or low coercivity magnetic material that can be deposited on the substrate. Low coercivity magnetic materials have a lower critical magnetic field strength required to switch the direction of magnetization. Thus, using a low coercivity magnetic material 235 on the proxy card 200 ensures that the direction of magnetization of the particles in the magnetic material can be switched by the magnetic field induced by the flow of current through the traces. Examples of low coercivity magnetic materials include ferromagnetic materials, for example, ferrites, Cobalt-Nickel alloys, Cobalt-Nickel-Iron alloys, Iron-Nitride alloys, or the like. In some embodiments, a suitable coercivity magnetic material can be selected based on calculation of a magnetic field around a trace using Ampere's law. In general, any low coercivity magnetic material having a coercivity value of 350 Oersted or less can be utilized. In other embodiments, the magnetic material 235 need not be low coercivity magnetic material.

Figure 3:
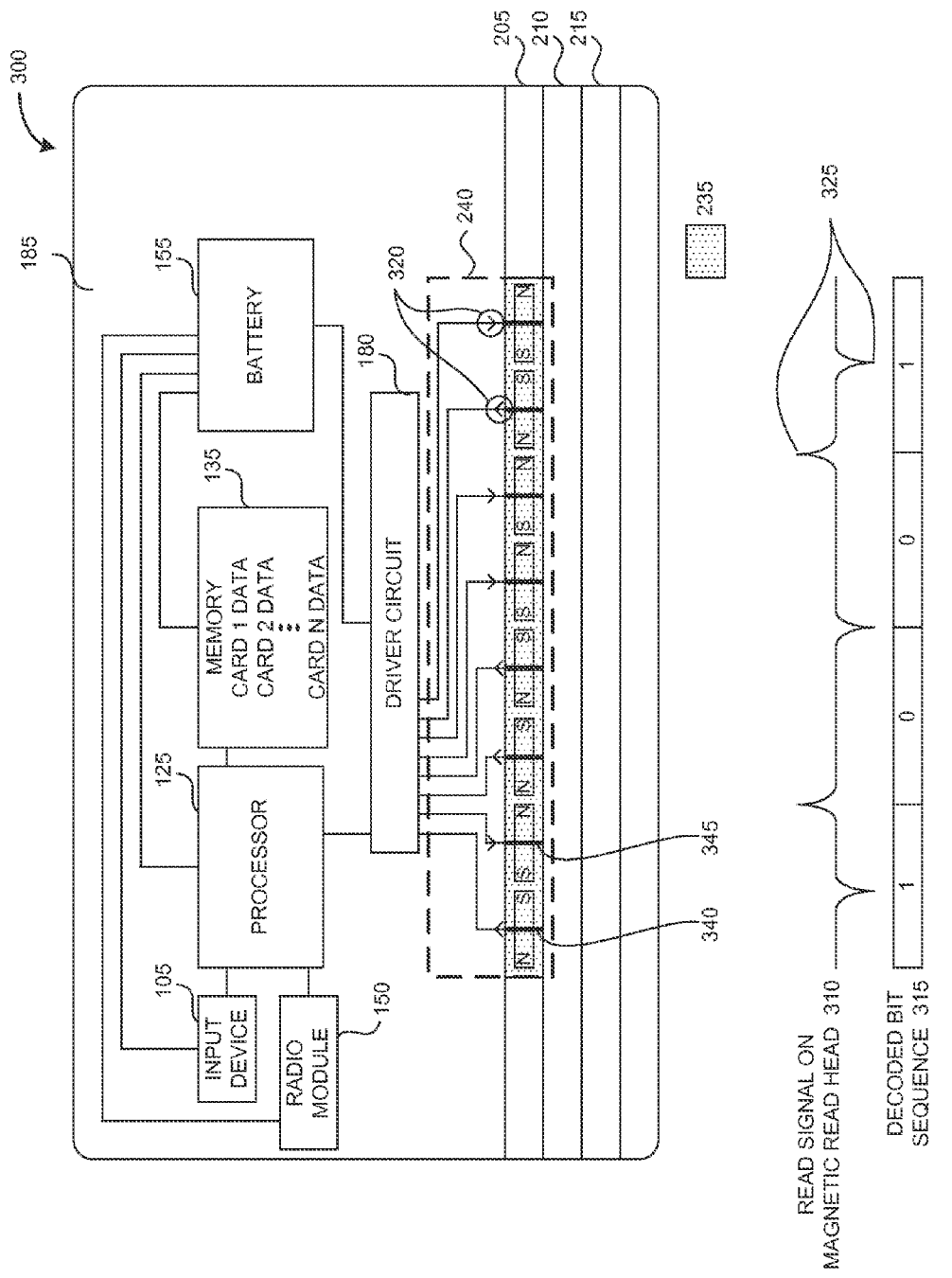
FIG. 3 is a block diagram illustrating encoding a set of magnetic stripe data associated with a payment card on a magnetic stripe emulator of a proxy card in accordance with a first embodiment.

FIG. 3 is a block diagram illustrating encoding a set of magnetic stripe data associated with a payment card on a magnetic stripe emulator of a proxy card in accordance with a first embodiment. When a payment card selected by a user using an input device 105 is to be emulated by the proxy card 300, a processor 125 in the proxy card retrieves a set of magnetic stripe data associated with the selected payment card from the memory 135 and generates electrical signals to drive current through the parallel traces that form the magnetic stripe emulator (e.g., 205) according to a pattern. The pattern includes a direction in which current is to be driven through the traces. For example, as illustrated, current flows through a trace 340 in a first direction (e.g., up direction as shown). The current flowing through the trace 340 in the first direction induces a magnetic field around the trace 340. The direction of the magnetic field is given by the right hand rule. The magnetic field around the trace 340 causes the magnetic material 235 around the trace to be polarized in a one direction (e.g., North (N)-South (S) direction as illustrated). Similarly, in the case of a trace 345 adjacent to the trace 340, current flows through trace 345 in a second direction opposite from the first direction (e.g., down direction as shown). Consequently, the magnetic field induced by the current flowing in the second direction polarizes the magnetic material around the trace 345 in the opposite direction (e.g., S-N direction as illustrated). In this manner, driving current in a selected direction through each trace polarizes the magnetic material around the trace in a specific direction. The polarized magnetic material around each trace effectively acts as a magnetic dipole. When two magnetic dipoles with opposing polarities are adjacent to each other, they attract each other causing the fluxes to merge with each other. When two magnetic dipoles with the same polarities (i.e., N-N or S-S) are adjacent to each other, the fluxes repel each other. The N-N and S-S interfaces where the flux lines are concentrated form the flux transitions.

A magnetic stripe reader detects the flux transition points where the flux lines are concentrated. When the proxy card encoded with the magnetic stripe data is swiped through a magnetic stripe reader, the presence of a magnetic field in the gap of a read head of the magnetic card reader induces a current through the coil that comprises the read head. The magnetic field is strongest at the N-N and S-S interfaces (or flux transitions) and corresponds to the peaks 325 in the analog read signal 310 detected by the magnetic read head. As illustrated, the direction of the read signal for the N-N interface is opposite from that for the S-S interface. The analog read signal 310 is decoded into a bit sequence 315 by the magnetic stripe reader.

Figure 4:
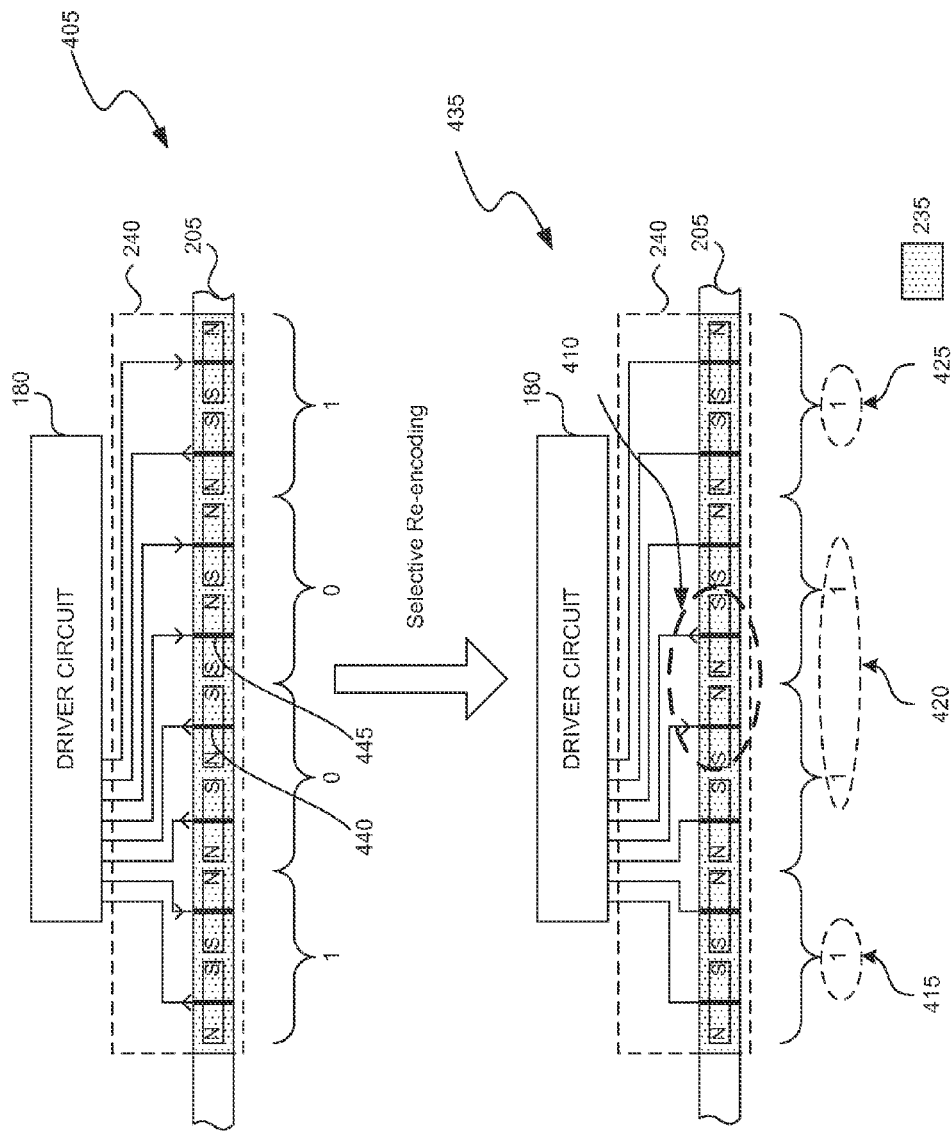
FIG. 4 is a block diagram illustrating selective encoding of a different set of magnetic stripe data associated with a different payment card on the magnetic stripe emulator of the proxy card of FIG. 3.

FIG. 4 is a block diagram illustrating selective encoding of a different set of magnetic stripe data associated with a different payment card on the magnetic stripe emulator of the proxy card of FIG. 3. As illustrated, the magnetic stripe emulator 205 of the proxy card 300 is initially encoded to emulate a set of magnetic stripe data associated with a payment card (e.g., payment card "A"). The zoomed in section 240 illustrates an alignment of magnetic dipoles around the traces that together encode a bit pattern "1001" for example. The diagram 405 thus represents the current state of the proxy card 300.

If a user desires to emulate a set of magnetic stripe data associated with another payment card (e.g., payment card "B") on the proxy card, the encoding on the magnetic stripe emulator 205 needs to be altered. In some embodiments, the alteration can be made selectively by switching the direction of polarization of the magnetic material around some, but not all of the traces. For example, if the proxy card is to emulate a bit pattern "1111" but is currently encoded to emulate a bit pattern "1001" as illustrated in FIG. 4, then the polarizations of the magnetic material around the two traces 440 and 445 need to switched. The polarizations can be switched by causing the driver circuit 180 to drive current through the traces 440 and 445 in specific directions. After switching the current direction, particles in the magnetic material around the traces 440 and 445 are re-aligned, as illustrated by section 410. After the selective encoding, there is no change in the first bit 415 and the last bit 425 from their previous states. However, the second and third bits 420 are flipped from their previous states (i.e., from 0 to 1). The diagram 435 thus represents the new state of the proxy card 300. By using such selective encoding technique, the amount of energy needed for a proxy card to switch from emulating one payment card to another is significantly reduced.

In some embodiments, a non-selective encoding technique can be used to switch a proxy card from emulating one payment card to another. When using the non-selective technique, the driver circuit 180 drives current through all the traces in selected directions to encode a bit pattern corresponding to the new payment card on the magnetic stripe emulator, regardless of the prior encoding on the magnetic stripe emulator. Although this non-selective encoding technique can require more energy than the non-selective encoding technique described above, a proxy card using the non-selective encoding technique can have a simpler logic and/or circuitry as there is need to take the previous encoding of the magnetic stripe emulator into account during the re-encoding process.

Figure 5:
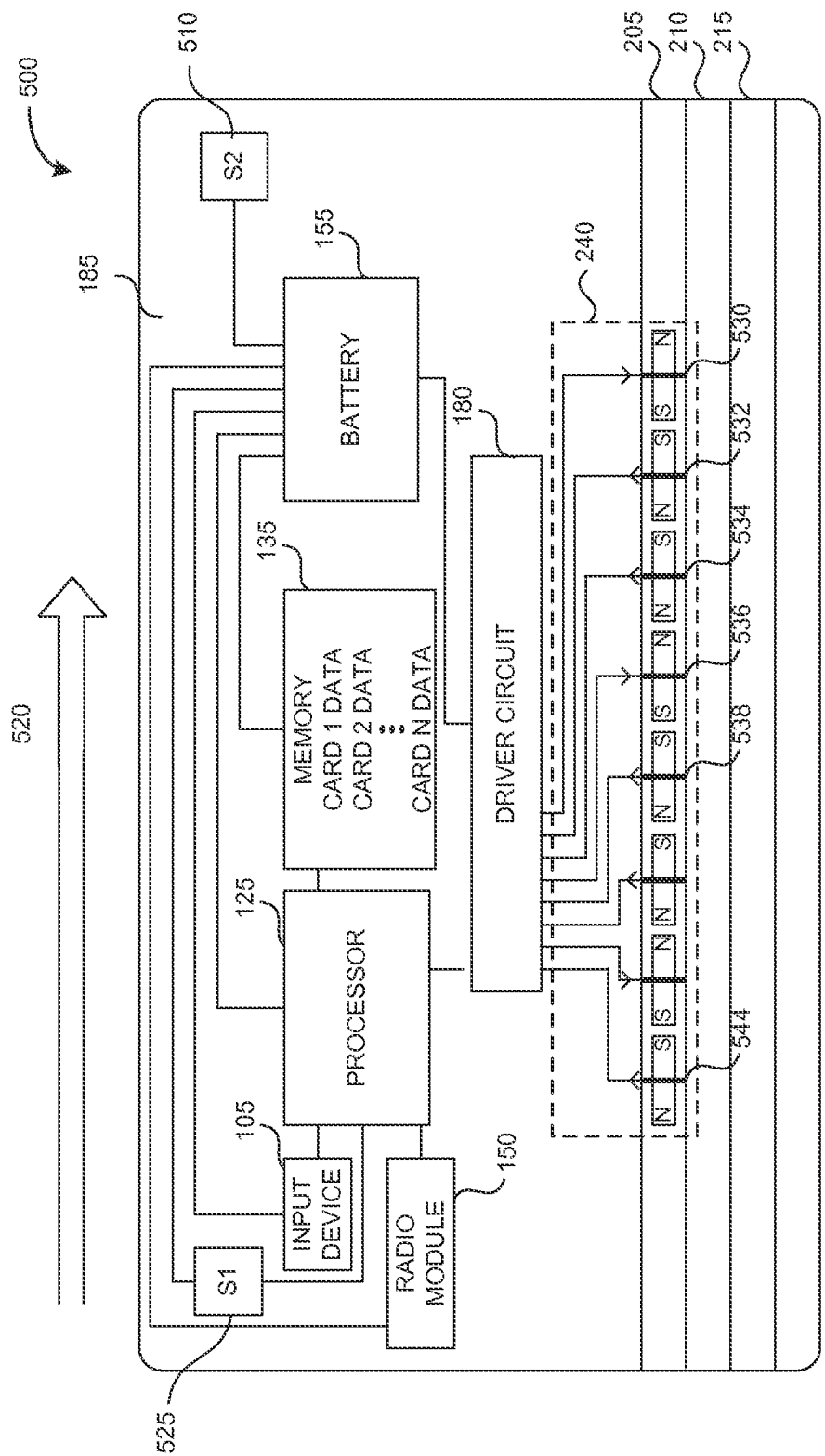
FIG. 5 is a block diagram illustrating encoding a set of magnetic stripe data on a magnetic stripe emulator of a proxy card in accordance with a second embodiment.

FIG. 5 is a block diagram illustrating encoding a set of magnetic stripe data on a magnetic stripe emulator of a proxy card in accordance with a second embodiment.

In this embodiment, the proxy card 500 includes an input device 105, a processor 125, a memory 135, a battery 155, a radio module 150 and a driver circuit 180 as described with reference to FIGS. 1-3. The proxy card 500 also includes sensors 510 and 525. One of these sensors can detect a start of a swipe and the other can detect an end of the swipe through a magnetic card reader. The sensors 510/515 can be any sensor from which an acceleration, speed or position information can be measured or derived. Examples of the sensors 510/515 include, but are not limited to: an accelerometer, a gyroscope, a light sensitive sensor, a capacitive sensor, or the like.

The proxy card 500 also includes a magnetic stripe emulator 205 having parallel traces. However, as illustrated by the zoomed in section 240, the parallel traces are not coated or covered with a magnetic medium. Because of the absence of the magnetic medium, the magnetic stripe emulator cannot emulate in a persistent manner. Instead, the proxy card 500 emulates magnetic stripe data in a non-persistent manner, whenever the proxy card 500 is swiped through a magnetic card reader. The proxy card 500 detects a start of a swipe based on a signal from the sensor 510 as the proxy card 500 is being swiped in the direction 520. In response, the proxy card 500 drives electrical current through the traces in selected directions to generate a magnetic field in a direction given by the right hand rule around each trace. When the proxy card 500 with the induced magnetic field is swiped through the magnetic card reader, the magnetic field emulating the magnetic stripe data is read by the magnetic stripe reader. The sensor 525 can act as an end sensor to detect the end of the swipe and signal the processor 125 to stop emulating the magnetic stripe data. In this manner, the proxy 500 card can emulate any magnetic stripe data in the absence of a magnetic medium.

Driving electrical current through all the traces at the same time and throughout the duration of the swipe in the manner described above can result in increased power consumption compared to the embodiment of the proxy card having a magnetic medium (e.g., proxy card 200, 300 in FIGS. 2-3). In some embodiments, the power consumption in the proxy card 500 can be reduced by driving electrical current through the traces in a staggered manner. For example, as the proxy card 500 is swiped in the direction 520, electrical current can be driven through trace 530 first and then trace 532 and so on. Alternatively, the traces can be divided into regions and electrical current can be driven through the regions in a staggered manner. For example, suppose region "A" includes traces 530-536 and region "B" includes traces 538-544. The proxy card 500 can drive electrical current through traces 530-536 of region A first and then through traces 538-544 of region B and so on as the proxy card 500 moves in the direction 520. In some embodiments, the timing interval between driving electrical current through one trace or region and the next trace or region can be predetermined (e.g., based on an average or maximum swipe speeds). In other embodiments, one or more position sensors and/or speed sensors on the proxy card 500 can be utilized to determine a position of the proxy card 500 relative to the magnetic stripe reader to time driving of electrical current through a trace or region corresponding to the position. Using this technique, only the trace or region being driven with electrical current consumes power. The rest of the traces or regions consume no power. In this manner, the proxy card 500 can emulate the magnetic stripe data more efficiently, without adversely impacting the read of the emulated signal by the magnetic stripe reader.

Figure 6:
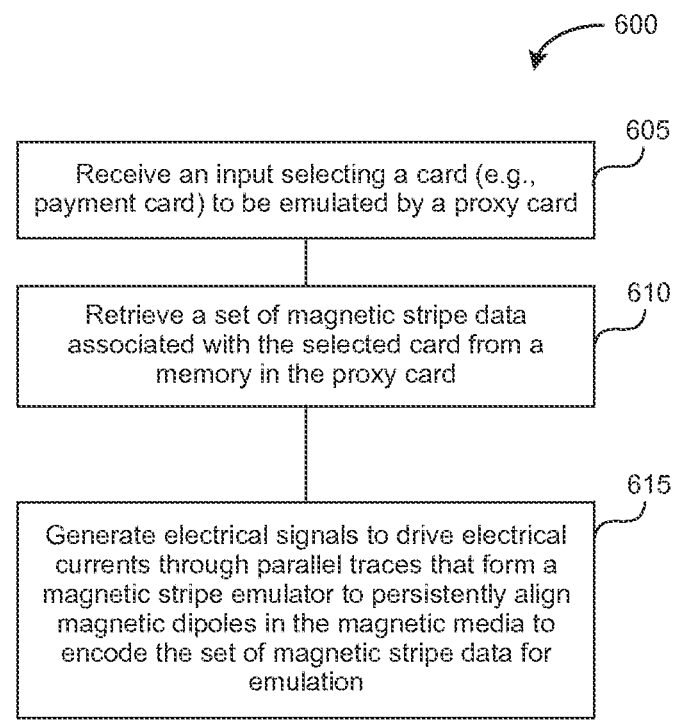
FIG. 6 is a logic flow diagram illustrating an example method of encoding a set of magnetic stripe data on a magnetic stripe emulator in a persistent manner.

FIG. 6 is a logic flow diagram illustrating an example method 600 of encoding a set of magnetic stripe data on a magnetic stripe emulator in a persistent manner. In the method 600, a processor 125 in a proxy card receives an input selecting a card (e.g., a payment card) to be emulated by the proxy card. The input can be received from an input device 105 in the proxy card. At block 610, the processor 125 obtains a set of magnetic stripe data associated with the selected card from a memory 135 in the proxy card. The proxy card then generates electrical signals to drive electrical current through the parallel traces that form the magnetic stripe emulator in selected directions at block 615. The current flowing through the traces in selected directions generate localized magnetic fields that persistently align magnetic dipoles in the magnetic medium around the traces of the magnetic stripe emulator. The alignment of the magnetic dipoles encodes the set of the magnetic stripe data in the magnetic stripe emulator to enable the proxy card to persistently emulate the set of magnetic stripe data. This method of encoding is non-selective as the set of the magnetic stripe data is encoded in the magnetic stripe emulator without taking the prior state of the magnetic stripe emulator into account.

Figure 7:
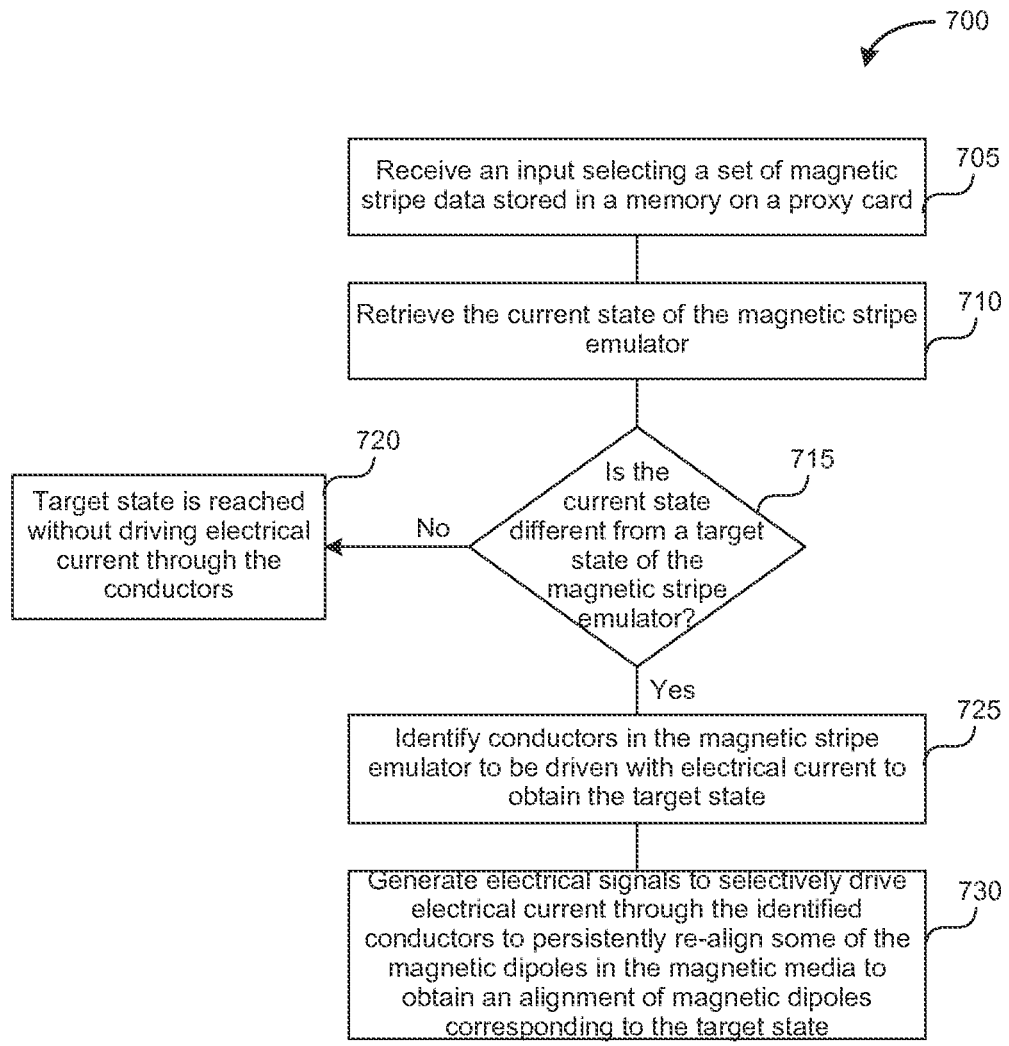
FIG. 7 is a logic flow diagram illustrating an example method of selectively encoding a set of magnetic stripe data on a magnetic stripe emulator in a persistent manner.

FIG. 7 is a logic flow diagram illustrating an example method 700 of selectively encoding a set of magnetic stripe data on a magnetic stripe emulator in a persistent manner. In this example method, a processor 125 in a proxy card receives an input selecting a set of magnetic stripe data associated with a target card (e.g., a payment card) stored in a memory 135 in a proxy card at block 705. The input can be received from an input device 105 in the proxy card. At block 710, the processor 125 retrieves or determines the current state of the magnetic stripe emulator in the proxy card. The current state of the magnetic stripe emulator represents the alignment of magnetic dipoles in the magnetic medium of the magnetic stripe emulator encoding a set of magnetic stripe data for emulation. At decision block 715, the processor 125 determines if the current state of the magnetic stripe emulator is different from a target state. The target state of the magnetic stripe emulator represents an alignment of magnetic dipoles in the magnetic medium of the magnetic stripe emulator encoding the selected set of magnetic stripe data associated with the target card. If the target and current states are the same, then the target state is reached without driving any electrical current through any of the conductors of the magnetic stripe emulator at block 720. Conversely, if the current state and the target state are different (i.e., target state is associated with the target card and the current state is associated with a first card), the processor 125 identifies one or more conductors in the magnetic stripe emulator to be driven with electrical current in one or more selected directions to obtain the target state at block 725. The processor 125 then selectively drives electrical current through the identified conductors to persistently re-align some of the magnetic dipoles in the magnetic medium to obtain an alignment of magnetic dipoles corresponding to the target state at block 730. In this manner, the proxy card can switch from emulating the first card to the target card in a selective and energy efficient manner.

Figure 8:
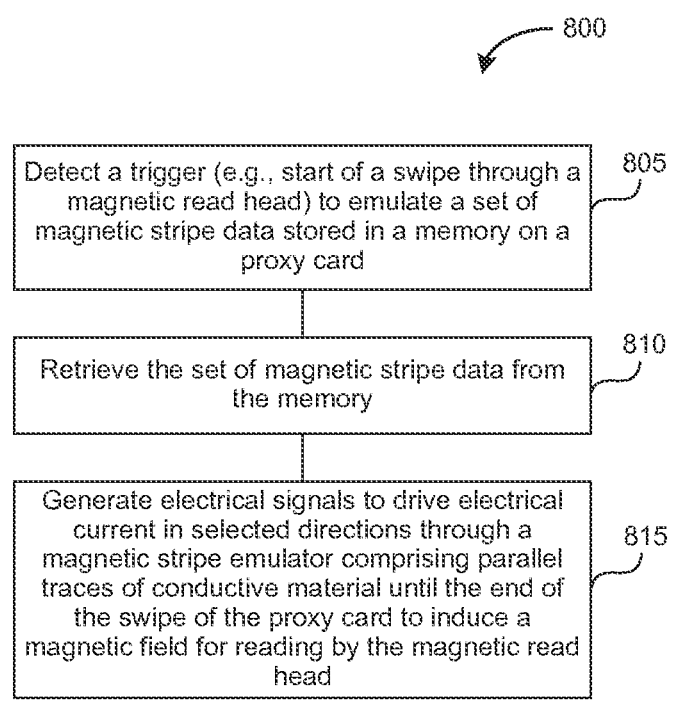
FIG. 8 is a logic flow diagram illustrating an example method of encoding a set of magnetic stripe data on a magnetic stripe emulator in a non-persistent manner.

FIG. 8 is a logic flow diagram illustrating an example method 800 of encoding a set of magnetic stripe data on a magnetic stripe emulator in a non-persistent manner. In this example method, a processor 125 in a proxy card (e.g., proxy card 500) detects a trigger to emulate a set of magnetic stripe data stored in a memory 135 in the proxy card. The trigger can be generated by a start sensor 510/525 in the proxy card in response to detecting a start of a swipe of the proxy card through a magnetic stripe reader. The processor 125 then retrieves the set of magnetic stripe data from the memory 135 at block 810. The processor 125 then generates electrical signals to drive electrical current in selected directions through parallel traces that form a magnetic stripe emulator of the proxy card until the end of the swipe of the proxy card, which in turn induces a magnetic field for reading by a magnetic stripe reader at block 815. In some embodiments, the electrical signals drive electrical current through each of the parallel traces at the same time while the proxy card is being swiped. In other embodiments, the electrical signals can be generated in a manner that ensures electrical current is driven through a parallel trace or a region (e.g., including two or more parallel traces) in a staggered manner. In such embodiments, at any given time, only one parallel trace or region is driven with electrical current and would consume power. The rest of the parallel traces or regions would consume no power. In this manner, a proxy card of the present disclosure does not need a magnetic medium to emulate a set of magnetic stripe data. Moreover, by driving electrical current through the traces in a staggered manner, the proxy card can emulate the set of magnetic stripe data efficiently.

What is claimed is:

1. A proxy payment card comprising:
 a substrate having coupled thereto:
   a memory configured to store a plurality of sets of magnetic stripe data associated respectively with a plurality of payment cards;
   a magnetic stripe emulator configured to emulate a magnetic stripe when the proxy payment card is swiped through a magnetic stripe card reader, the magnetic stripe emulator including a plurality of parallel linear traces, the traces being spaced apart from each other in an axis parallel to a direction in which the proxy payment card is designed to be swiped and oriented perpendicular to the direction in which the proxy payment card is designed to be swiped, the traces being made of conductive material, a length of the magnetic stripe emulator having a layer of a magnetic medium of low coercivity disposed over the traces;
   a processor electrically coupled to the memory and the plurality of parallel traces in the magnetic stripe emulator; and
   a power source configured to provide electrical power to the processor and the memory,
   the processor being configured to read a set of magnetic stripe data from the memory and drive electrical current along each of the traces in a selected direction to encode the set of magnetic stripe data into the magnetic stripe emulator persistently, such that for each trace the electrical current driven along the trace causes persistent alignment of a magnetic dipole in the magnetic medium in a region proximate to the trace, each said magnetic dipole being aligned parallel to the direction in which the proxy payment card is designed to be swiped and perpendicular to the corresponding trace and having a polarization determined by a direction of current driven along the corresponding trace, such that when the magnetic stripe emulator has been encoded the alignment of said magnetic dipoles in aggregate encodes persistently at least a portion of the set of magnetic stripe data.

2. The proxy payment card of claim 1, wherein the low coercivity magnetic medium has a coercivity value of 300 Oersted.

3. A method comprising:
 receiving, via an input device on a data-bearing card, an input selecting a payment card to be emulated by the data-bearing card;
 retrieving, by a processor on the data-bearing card, a set of magnetic stripe data associated with the selected payment card from a memory on the data-bearing card; and
 persistently encoding the set of magnetic stripe data in a magnetic stripe emulator on the data-bearing card to cause the magnetic stripe emulator to emulate persistently the set of magnetic stripe data, wherein said persistently encoding the set of magnetic stripe data includes driving electrical current along a selected one or more of a plurality of parallel linear traces of conductive material spaced apart from each other on the data-bearing card in an axis parallel to a direction in which the data-bearing card is designed to be swiped, where each trace is oriented perpendicular to the direction in which the data-bearing card is designed to be swiped and is disposed against a magnetic medium on the data-bearing card, such that the current driven along each selected trace causes alignment of a magnetic dipole in the magnetic medium in a region proximate to the trace, each said magnetic dipole being aligned parallel to the direction in which the proxy payment card is designed to be swiped and perpendicular to the corresponding trace and having a polarization determined by a direction of current driven along the corresponding trace, such that when the magnetic stripe emulator has been encoded the alignment of said magnetic dipoles in aggregate encodes persistently at least a portion of the set of magnetic stripe data.

4. The method of claim 3, wherein the magnetic material has a coercivity of less than 350 Oersted.

5. The method of claim 3, wherein the current driven through each selected trace polarizes the magnetic medium over the trace in a selected direction perpendicular to a direction of the electrical current, so as to form a sequence of flux transitions corresponding to the set of magnetic stripe data.

6. The method of claim 3, further comprising:
obtaining a current state of the magnetic stripe emulator;
determining that the current state of the magnetic stripe emulator is different from a target state of the magnetic stripe emulator; and
identifying traces from the plurality of parallel linear traces around which a direction of polarization of the magnetic medium is to be switched to obtain the target state.

7. The method of claim 6, wherein persistently encoding the set of magnetic stripe data on the magnetic stripe emulator further comprises:
driving electrical current through the identified traces in selected directions to produce a magnetic field around each identified trace so as to switch the direction of polarization of the magnetic material around the identified traces and form a sequence of flux transitions corresponding to the set of magnetic stripe data.

* * * * *